April 19, 1927.  1,625,243
L. CORTZ
QUICK ACTION WAFFLE IRON
Filed Nov. 27, 1925
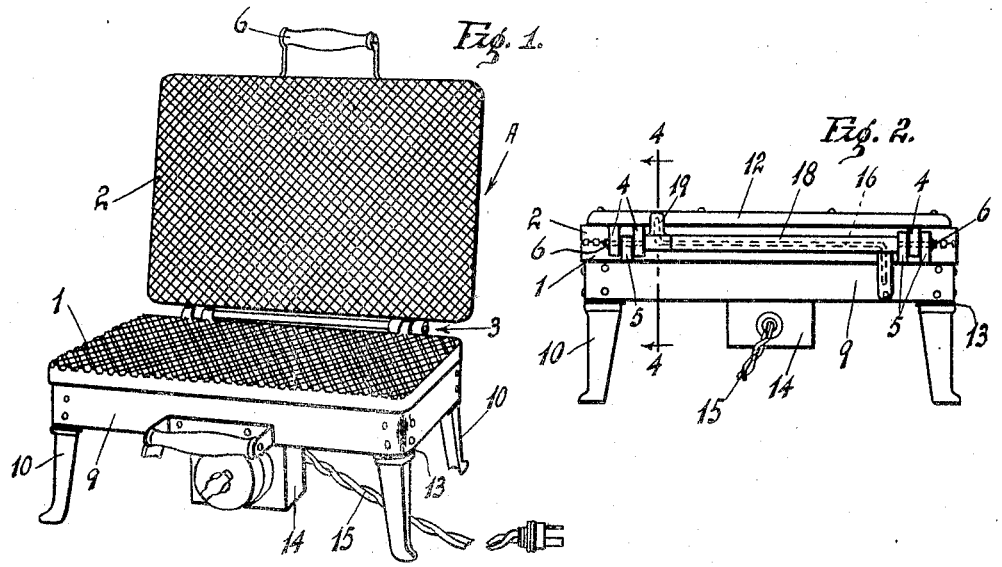
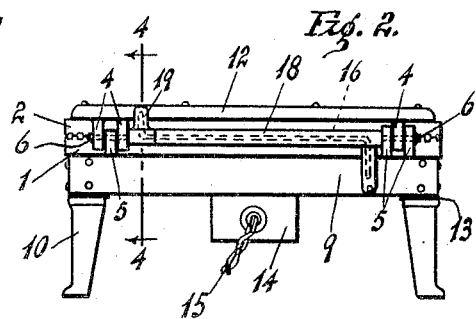
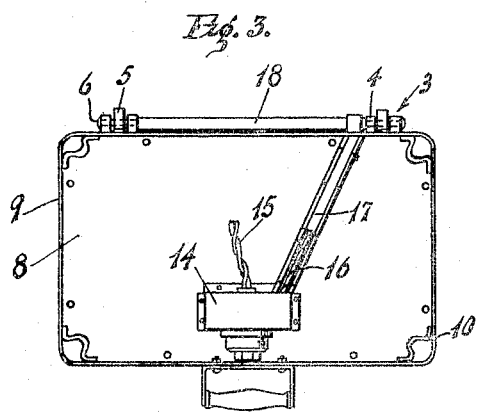
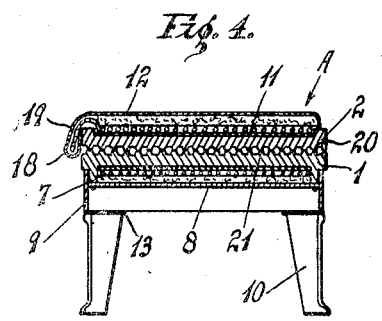
INVENTOR.
Louis Cortz.
BY
*H. A. Dickman*
ATTORNEY.

Patented Apr. 19, 1927.

1,625,243

UNITED STATES PATENT OFFICE.

LOUIS CORTZ, OF LONG BEACH, CALIFORNIA.

QUICK-ACTION WAFFLE IRON.

Application filed November 27, 1925. Serial No. 71,632.

An object of my invention is to provide an electrically operated iron upon which thin waffle like cakes may be baked for use in preparing ice cream sandwiches.

Another object is to provide a simple durable and efficient iron for the purpose stated.

Other objects, advantages and features of invention may appear from the accompanying drawing, the subjoined detailed description and appended claims.

In the drawing illustrating my invention,
Fig. 1 is a perspective view of my iron.
Fig. 2 is a rear elevation of the same.
Fig. 3 is a bottom plan view of the iron.
Fig. 4 is a sectional view taken on line 4—4 Fig. 2.

Referring more particularly to the drawing:

This invention is particularly applicable for baking thin, crisp, waffle like cakes which are used in making ice cream sandwiches. A slice of brick ice cream is placed between two of the cakes to form a delicious confection.

My waffle iron A comprises a rectangular stationary flat bottom plate 1, and a rectangular flat top plate 2, hinged at the rear as at 3 to the bottom plate. The top plate 2 is formed with lugs 4—4, and the bottom plate 1 with lugs 5—5, and pins 6—6 extend through the lugs 4, 5 to form the hinge 3.

A handle 6 is secured to the front edge of plate 2 whereby said plate may be lifted.

Heating coils 7 are provided in the plate I and a cover plate 8 secured to the plate 1 protects said coils. An apron 9 is secured to and depends from the plate 1, and legs 10 are secured to said apron whereby the iron A is supported.

A heating coil 11 is mounted in the plate 2 and a cover plate 12 is secured to the plate 2 to protect said coil.

Insulating pads 13 are inserted between the legs 10 and apron 9 to prevent any short circuiting of the electrical current to the ground.

A switch 14 is secured to the plate 8 adjacent the forward edge thereof, so that it is readily accessible to the operator, and a cord 15 conducts the current thereto from the line (not shown). The switch is directly connected to the coil 7 in a well known manner through the plate 8. A lead 16 extends from the switch 14 through a conduit 17 on the bottom of plate 8 to a tube 18 extending across the back of the iron A between lugs 4, 5. A short conduit 19 extends from the tube 18 to the cover plate 12 and is secured thereto and the lead 16 extends through the conduits 17 and 19 to the coil 11. Thus the coil 11 is supplied with current through a lead which is entirely covered and protected, which is more sightly and is not liable to get out of order or injured.

Each of the plates 1, 2 are formed with short protuberances 20, 21 set very close together so that the cake baked in the iron will be thin and crisp. Also the rectangular form of the iron enables a plurality of cakes to be baked at one time;—for example six or more.

Having declared my invention I claim:

1. An electrically heated baking iron comprising a rectangular lower plate, a rectangular upper plate hinged to said lower plate, the abutting faces of said plates being formed with short protuberances set close together, a heating coil in said lower plate, a heating coil in said upper plate, a switch mounted on said lower plate adjacent the forward edge thereof, and electrically connected to said coil in the lower plate, a horizontally extending tube mounted at the rear of said iron, a conduit on said lower plate extending from said switch box to said tube, a second conduit extending from said tube to the upper plate, and a lead extending thru said tube and conduits to the coil in the upper plate.

2. An electrically heated waffle iron comprising a rectangular lower plate, a rectangular upper plate, lugs on said lower plate and upper plates, a pin extending through said lugs whereby the plates are hinged together, the abutting faces of said plates being formed with short protuberances set close together, a heating coil in said lower plate, a heating coil in said upper plate, a switch mounted on the bottom of said lower plate adjacent the forward edge thereof and electrically connected to the coil in the lower plate, a tube extending over said pin between the lugs, a conduit on the bottom of the lower plate extending from said switch position to the tube, a second conduit extending from said tube to the upper plate and secured to said upper plate, a lead extending through said tube and conduits to the coil in the upper plate, an apron depending from the lower plate, legs secured to said apron and insulating pads positioned between said legs and the apron.

In testimony whereof I affix my signature.

LOUIS CORTZ.